US008810076B2

(12) United States Patent
Levi

(10) Patent No.: US 8,810,076 B2
(45) Date of Patent: Aug. 19, 2014

(54) ELECTRICAL APPLIANCE HOLDER SYSTEM

(76) Inventor: Natalie Levi, Dallas, TX (US)

( * ) Notice: Subject to any disclaimer, the term of this patent is extended or adjusted under 35 U.S.C. 154(b) by 670 days.

(21) Appl. No.: 12/960,649

(22) Filed: Dec. 6, 2010

(65) Prior Publication Data

US 2011/0133572 A1 Jun. 9, 2011

Related U.S. Application Data

(60) Provisional application No. 61/266,832, filed on Dec. 4, 2009.

(51) Int. Cl.

| | |
|---|---|
| ***H01H 3/00*** | (2006.01) |
| ***H01H 47/00*** | (2006.01) |
| ***A47B 97/00*** | (2006.01) |
| ***A47B 45/00*** | (2006.01) |
| ***H02G 11/02*** | (2006.01) |

(52) U.S. Cl.
USPC ......... 307/139; 361/643; 211/70.6; 191/12.4; 312/24; 312/204

(58) Field of Classification Search
None
See application file for complete search history.

(56) References Cited

U.S. PATENT DOCUMENTS

| | | | | |
|---|---|---|---|---|
| 3,477,585 | A | 11/1969 | Adams | |
| 3,506,326 | A * | 4/1970 | Tantillo | 312/227 |
| 4,241,963 | A * | 12/1980 | Seidel | 312/228 |
| 4,742,429 | A | 5/1988 | Arrendiell et al. | |
| 4,809,393 | A | 3/1989 | Goodrich et al. | |
| 4,813,604 | A * | 3/1989 | Curran, Jr. | 239/163 |
| 5,005,711 | A * | 4/1991 | Peatross et al. | 211/70.7 |
| 5,370,452 | A | 12/1994 | Baer | |
| 5,513,816 | A * | 5/1996 | Grubb | 242/398 |
| 5,577,819 | A | 11/1996 | Olsen | |
| 5,595,494 | A * | 1/1997 | Wiebe | 439/211 |
| 5,917,694 | A | 6/1999 | Denny | |
| 5,924,892 | A | 7/1999 | Ferracina | |

(Continued)

FOREIGN PATENT DOCUMENTS

EP 0271653 A2 6/1988

OTHER PUBLICATIONS

Photos of existing appliance holder—admitted prior art.

(Continued)

*Primary Examiner* — Jared Fureman
*Assistant Examiner* — Aqeel Bukhari
(74) *Attorney, Agent, or Firm* — Grady K. Bergen; Griggs Bergen LLP

(57) ABSTRACT

An appliance holder system for electrical handheld appliances of the type having a flexible electrical power cord attached thereto is provided. The appliance holder system includes an appliance holder assembly having at least one receptacle for receiving and storing at least one electrical handheld appliance having a flexible electrical power cord attached thereto. A power cord storage assembly of the system has a pair of spaced apart cord wrapping elements about which the flexible electrical power cord may be wrapped for storage. At least one of the cord wrapping elements is movable between a storage and release position. The cord wrapping elements are configured to retain the wrapped power cord upon the power cord storage assembly when the at least one of the cord wrapping elements is in the storage position and wherein the wrapped power cord may be removed from the power cord storage assembly without unwrapping the wrapped power cord when the at least one of the cord wrapping elements is moved to the release position.

21 Claims, 9 Drawing Sheets

(56) References Cited

U.S. PATENT DOCUMENTS

| | | | | |
|---|---|---|---|---|
| 6,123,299 | A | 9/2000 | Zach, Sr. | |
| 6,206,318 | B1 | 3/2001 | Glass | |
| 6,591,952 | B1 * | 7/2003 | Randall | 191/12.4 |
| 6,769,554 | B1 | 8/2004 | Udofiah | |
| 6,955,260 | B1 | 10/2005 | Gaillard | |
| 7,189,107 | B1 * | 3/2007 | Strayer et al. | 439/501 |
| 7,198,339 | B2 * | 4/2007 | Baron | 312/228 |
| 2004/0035972 | A1 * | 2/2004 | Glass | 242/388.6 |
| 2008/0029428 | A1 | 2/2008 | Kolada | |
| 2010/0139638 | A1 * | 6/2010 | Hargrave et al. | 126/19 R |

OTHER PUBLICATIONS

Hafele, Mounting Instructions Item No. 372.68 Series and 372.67 Series—Lift-up Fittings—Verso and Strato, no date, pp. 1-28.

Hafele, Mounting Instructions Item No. 372.64 Series—Lift-up Fittings—, Senso, no date, pp. 1-16.

International Search Report dated Feb. 9, 2011 for PCT/US2010/059031 counterpart application.

* cited by examiner

ELECTRICAL APPLIANCE HOLDER SYSTEM

CROSS-REFERENCE TO RELATED APPLICATIONS

This application claims the benefit of U.S. Provisional Application No. 61/266,832, filed Dec. 4, 2009, which is incorporated herein by reference in its entirety for all purposes.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

Figure 1:
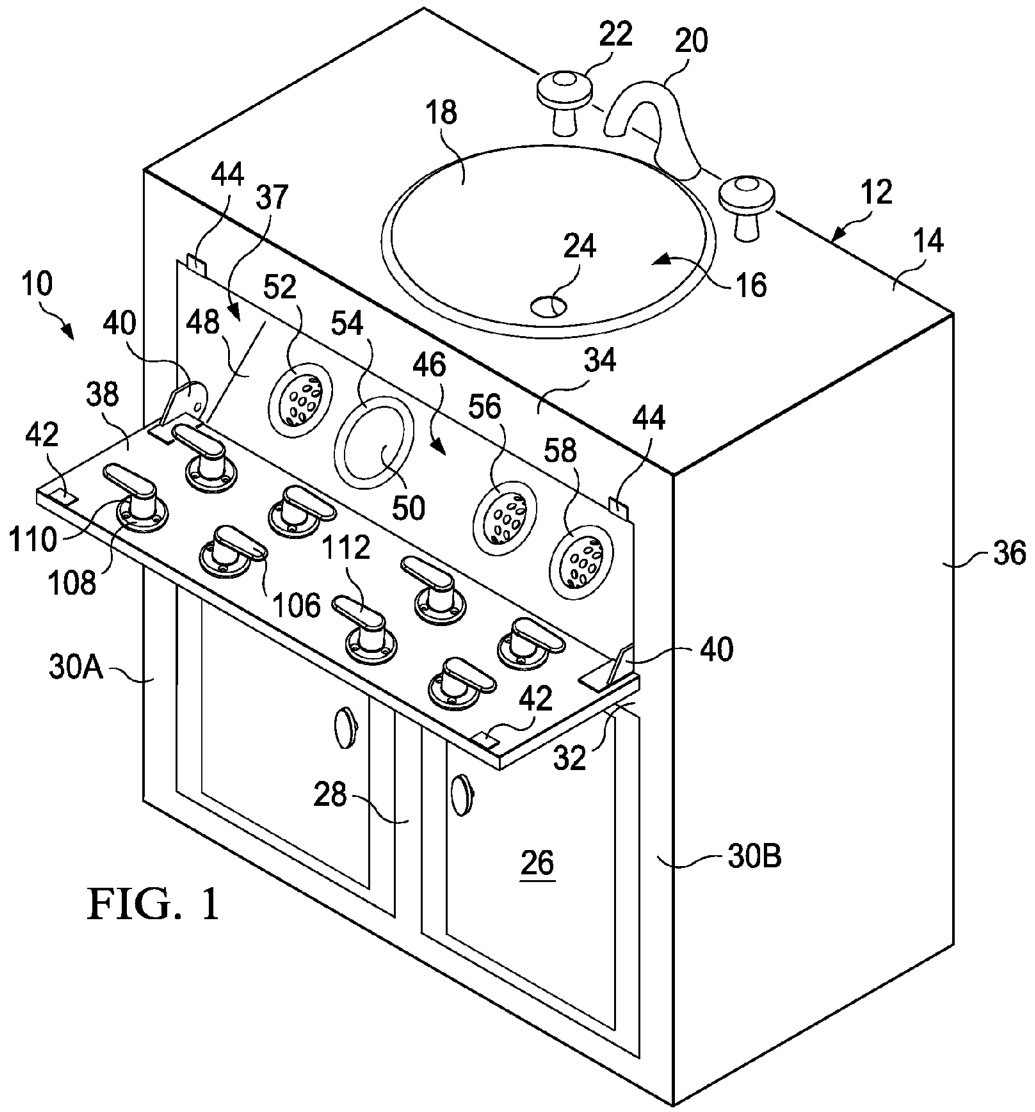
FIG. 1 is front perspective view of an electrical appliance holder system constructed in accordance with the invention.

Referring to FIG. 1, an embodiment of an appliance holder system 10 for holding and storing electrical handheld appliances is shown. In particular, the appliance holder system 10 is the type used for holding electrical handheld appliances having an electrical power cord attached to the appliance for plugging into an electrical outlet. Non-limiting examples of electrical appliances for which the system 10 may be used include hair dryers, curling irons, flat irons, electric toothbrushes, water picks, shavers, clippers, etc., although other items (e.g. hairbrushes, combs, picks, etc.) and appliances may be held and stored in the system 10.

As shown in FIG. 1, the system 10 may be incorporated into a cabinet assembly 12. The cabinet assembly 12 may be generally conventional in configuration and may include those cabinets assemblies commonly found in houses and other dwellings. In many applications, the cabinet assembly 12 is one that is provided in a bathroom, although it may be found or used in other areas as well. The cabinet assembly 12 includes a generally level and flat countertop 14. The countertop is typically provided at a height above the floor that is about waist level. This may range from about 20 to about 45 inches or more, more typically from about 30 to about 40 inches. The countertop 14 may have any suitable depth, although typical depths range from about 18 to about 30 inches or more, more typically from about 18 to about 24 inches.

It should be noted in the description, if a numerical value or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific points within the range, or even no point within the range, are explicitly identified or refer to, it is to be understood that the inventor appreciates and understands that any and all points within the range are to be considered to have been specified, and that inventor possesses the entire range and all points within the range.

The cabinet assembly 12 may constitute a vanity cabinet assembly, such as found in bathrooms and the like, and that includes a sink assembly 16 having a basin or sink 18 that may be provided in the countertop 14 for collecting water from a faucet 20 that is plumbed to a suitable water supply (not shown). Suitable controls 22 may be provided for controlling water flow to the faucet 20. In other embodiments, the cabinet assembly 12 may not include a sink assembly. The basin 18 of the sink assembly 16 may be recessed so that it extends into and projects below the countertop 14 into an interior of the cabinet assembly 12. The basin 18 may include a drain 24 that is coupled to suitable plumbing for drainage.

The cabinet assembly 12 may include a forward facing door or doors 26 located at the front of the cabinet assembly 12 for accessing the interior of the cabinet assembly 12. In the embodiment shown, there are a pair of doors 26 arranged side-by-side that are each mounted on hinges (not shown) along their outer side edges to allow pivotal movement of the doors 26 and thus allow selective access to the cabinet interior. In other embodiments, a single larger door hinged along one side may be used instead of the pair of doors for accessing the interior of the cabinet assembly 12.

The front face of the cabinet assembly 12 may be framed or unframed. In the embodiment shown in FIG. 1, the front face of the cabinet assembly 12 is framed with framing members 28, 30A, 30B, 32, 34, with the doors 26 covering openings defined by the upright framing members 28, 30A, 30B and transverse cross member 32. In other embodiments, the cabinet assembly 12 may have a non-framed forward face that does not include any framing members.

In certain embodiments, the cabinet assembly 12 may includes sidewalls 36, which may be formed from cabinetry materials or may be formed by a wall or walls of the room or building in which the cabinet assembly 12 is used.

It should be understood that the cabinet assembly 12 of FIG. 1 may be representative of only a section of a larger cabinet assembly, as the counter top 14 and underlying cabinetry structures may extend for some distance from either side, with additional doors (not shown) for accessing the interior of these extended portions of cabinet interior below the extended countertop 14, which may or may not include any additional sink assembly, such as the sink assembly 16. Optionally or additionally, drawer assemblies (not shown) or other cabinetry components may be provided in these extended portions of the cabinet assembly. Thus, it should be understood that the cabinet assembly 12 shown in FIG. 1 is that which may correspond to a section of cabinetry generally corresponding to the widths used for a large single door or pair of smaller doors 26, as shown and described. This width may vary, but a typical width is from about 18 to 60 inches, more typically from about 22 to about 36 inches. Common widths for vanity cabinets range from about 24 to about 30 inches.

The cabinet assembly 12 may be a free-standing cabinet assembly that is independent of any building structure or may be built into a building structure. In certain embodiments, the cabinet assembly 12 may be a preexisting cabinet assembly that does not include an appliance holder system but is further modified to incorporate the components of the appliance holder system. In other embodiments, the cabinet assembly 12 may be prefabricated, constructed or manufactured to include the appliance holder system components.

The forward face of the cabinet assembly 12 may include a space or area 37 below the countertop 14 and above the doors 26. In conventional vanity cabinet assemblies that include a sink, the space 37 above the doors 26 is typically covered by a false panel that is fixed in place to cover the opening 37. In the present invention, this false panel is replaced or modified by a pivotal panel door 38 that is mounted to the cabinet assembly by hinges 40, which may be located at the inward bottom corners of the panel 38 so that the panel 38 pivots about a longitudinal axis located generally along the lower edge of the panel 38. The upper edge of the panel 38 may be free so that it can be rotated away from the upper edge of the opening 37. The hinges 40 may limit the degree of rotation (e.g. 90-degree hinges) of the panel door 38 so that when the panel 38 is fully opened it is located in a general horizontal position, as shown in FIG. 1. In other embodiments, the angle of rotation allowed by the hinges 40 may vary, such as between from about 60 to about 180 degrees. When closed, the panel door 38 is oriented in a generally upright or vertical position and may be generally flush with the forward face of the cabinet assembly 12 and may have the appearance of a conventional false panel. In certain embodiments, all or a portion of the panel door 38 may be set within the opening 37 itself so that the forward face of the panel 38 is generally flush with structural members of the cabinet. In certain embodiments, a handle or handles (not shown) may be provided on the forward face of the panel 38 to facilitate opening and closing of the panel door 38.

In certain applications, the false panel of an existing cabinet assembly with which the holder system 10 is incorporated is removed and used as the pivotal panel 38. Because the inward face of any existing false panels are typically unfinished, the inward face or other areas may be further modified or finished by cutting, smoothing, sanding, staining, painting, etc., since they will become visible during use. In other embodiments, a separate panel may be used to replace any existing false panel, which is removed.

In the embodiment shown, the panel 38 is installed within the framed area of the cabinet assembly 12 to cover the opening 37 defined by the framing members 30A, 30B, 32 and 34. In non-framed cabinet assemblies, additional support or framing members (not shown) similar to the members 30A, 30B, 32 or 34, may be employed to facilitate mounting of the pivotal panel 38.

A releasable latching mechanism may be employed to retain the panel 38 in place in the upright closed position. The latching mechanism may be any suitable releasable latching mechanism that holds the panel 38 in the closed and upright position. An example of a suitable latching mechanism includes a magnetic latching mechanism such as formed by a permanent magnetic and/or ferromagnetic plates or members 42, 44 provided on the panel 44 and framing structures. Non-magnetic latching mechanisms may also be used. In other embodiments, the latching mechanism may be provided by the hinges 40, which may be spring biased hinges that are biased to a closed position. The biasing force of the hinges 40 may be that which is exerted sufficiently to close the panel 38 only when the panel 38 is at an intermediate position and that is overcome or reduced when the panel 38 is fully open so that the panel 38 remains in the fully open position during use. Other latching mechanisms may also be used for releasably retaining the panel 38 in the open or closed positions.

Figure 2:
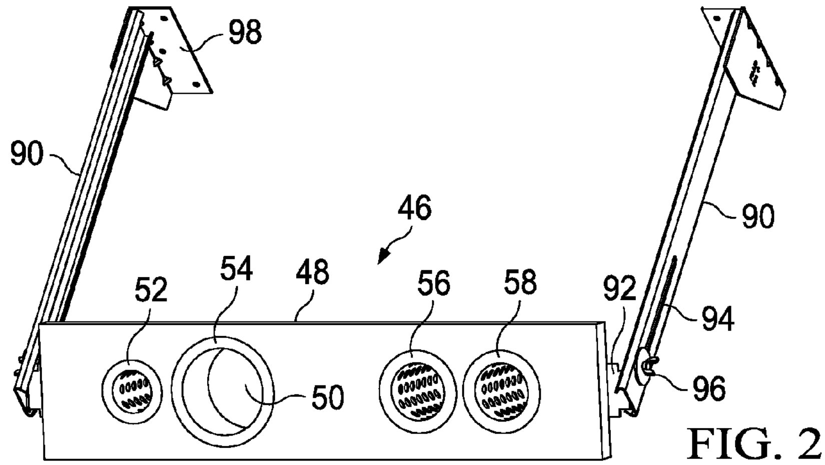
FIG. 2 is a front perspective view of an appliance holder assembly of the appliance holder system of FIG. 1.

Referring to FIG. 2, an appliance holder assembly 46 is shown. The appliance holder assembly 46 includes an appliance holder panel or member 48, which may be a generally flat panel or member. Other configurations for the panel or member 48 may be used, which may be non-flat. The size of the panel 48 may be fixed or it may be adjustable to different sizes. In certain embodiments, the panel may have a length of from about 18 inches to about 36 inches, but a typical width is from about 20 to 30 inches, more typically from about 22 to about 28 inches. In one embodiment, the panel 48 has a length of about 24 inches.

The panel 48 is provided with one or more openings or receptacles, represented generally at 50, formed along its length. The receptacles 50 may be of different sizes and configurations for receiving various handheld appliances in accordance with the invention. Examples of suitable sizes for the receptacles 50 may include those with a transverse cross dimension or diameter of about 1 inch or less to about 5 or 6 inches or more.

Optional receptacle inserts, such as the inserts 52, 54, 56, 58, may be received within the receptacles 50 of the panel 48. The inserts 52, 54, 56, 58 may be removable or fixed within the openings 50. The receptacle inserts may facilitate absorption and dissipation of heat from stored devices or appliances. The receptacles may vary in size, shape and configuration. The size and shape of the receptacle inserts 52, 54, 56, 58 may correspond to the size and shape of the receptacle 50 in which they are positioned. As an illustrative example, the insert 52 may have a diameter of approximately 1½ inch, the insert 54 may have a diameter of 3 inches and the inserts 56, 58 may each have diameters of 2 inches. The length of the inserts may range from about 1 inch to about 2, 3, 4, 5, 6, 7 or 8 inches or more. It should be noted that unless otherwise stated or is apparent from its context, the expression "receptacle" or similar expressions may be used interchangeably with respect to the openings 50 and the receptacle inserts, as they may each function as receptacles for storing appliances or other items.

Figure 3A:
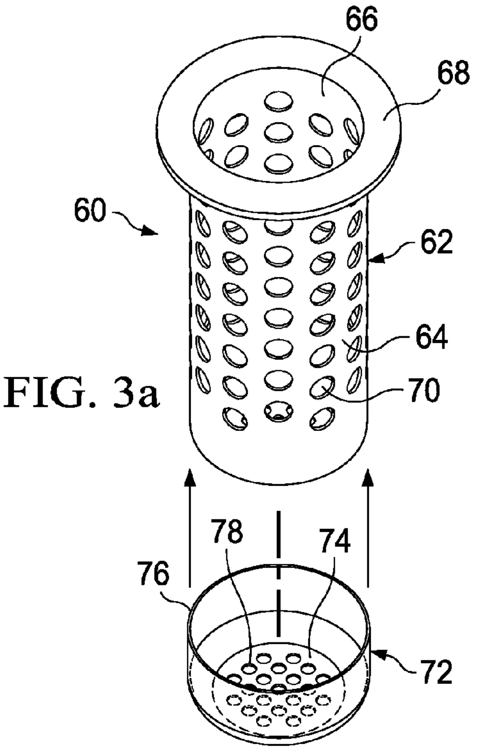
FIG. 3*a* is a perspective view of a receptacle insert of the appliance holder system of FIG. 1.

Referring to FIG. 3*a*, a vented insert 60 is shown, which is representative of the inserts 52, 56 and 58 of FIG. 2. The receptacle insert 60 includes a receptacle insert body 62. The insert body 62 may be configured as a tube or cylinder having a sidewall 64 that extends from an open upper end 66 to define a hollow interior of the insert body 62 and that extends to an open lower end. The upper end of the insert 60 may be provided with retaining member 68, which may be in the form of an annular flange that projects radially from the sidewall 64. The retaining member 68 may engage and abut the area of the panel 48 surrounding the opening 50 into which the insert is received to retain the insert in place with the receptacle 50. The receptacle inserts or portions thereof can be made with any material designed to withstand high heat or temperatures. Non-limiting examples of suitable materials may include metal, stainless steel, silicone, fiberglass, heat-resistant plastics, ceramics, and the like, and combinations of such materials.

As shown in FIG. 3*a*, the receptacle insert 60 may also contain one or more vents or openings 70 formed in the sidewall 64. A plurality of openings 70 may be formed in the sidewall 64 that are arranged along all or a portion of the length and around all or a portion of the circumference of the sidewall 64. The plurality of openings may be similar or dissimilar in shape and size. The openings 70 may be formed as circles, ovals, squares, rectangular, polygons, elongated slits, etc. A non-limiting example of a suitable size for the openings 70 include those having a diameter or transverse cross dimensions of from about 1/16 inch to about 3/4 inch or more. The openings 70 facilitate ventilating of the interior of the insert body 62 to dissipate heat given off by the appliances held therein. This may increase the life of the stored appliance, which may be prone to overheat if kept in a non-ventilated area. The vented receptacle insert 60 thus makes the appliance holder system 10 particularly well suited for storing and holding heated electrical appliances.

An optional end cap 72 may also be provided with the receptacle insert 60 to facilitate closing of the opening of the lower end of insert body 62 to prevent passage of objects therethrough. The end cap 72 is configured for engagement with the lower end of the insert body 62 and may be constructed of the same or similar materials. The end cap 72 may be configured as a cup having a base 74 with an upwardly extending collar or wall 76 that is configured for either receiving the lower end of the insert body 62 or being received within the lower end of the insert body 62 and sized and configured accordingly. The base 74 and/or collar 76 may also be provided with vents or openings 78, which may be similar to those openings 70 formed in the sidewall 64. The end cap 72 may be held in place by a frictional fit or by cooperating threads formed on the collar 76 and of the lower end of the insert body 62. Other coupling or fastening means may also be used. The end cap 72 may removably coupled or be permanently coupled to the insert body 62. In other embodiments, the insert body 62 itself may be formed so that the lower end is closed off and so that no separate end cap is required. In such embodiments, the closed lower end may be provided with or without vents or openings.

Figure 3B:
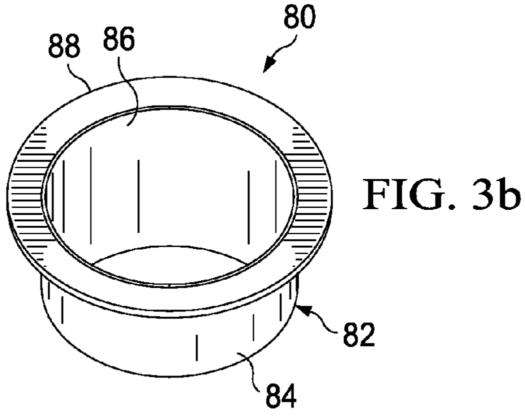
FIG. 3*b* is a perspective view of another embodiment of a receptacle insert of the appliance holder system of FIG. 1.

FIG. 3*b* shows another receptacle insert 80, which may representative of the insert 54 of FIG. 2. The insert 80 is similar to the insert 60 of FIG. 3*a*. The insert 80 has an insert body 82 that may be configured as a tube or cylinder having a sidewall 84 that extends from an open upper end 86 to define a hollow interior of the insert body 82 and that extends to an open lower end. The upper end of the insert 80 may be provided with a retaining member 88, which may be an outwardly extending member, such as an annular flange that projects radially outward from the sidewall 84. The insert 80 differs from the insert 60 in that it lacks openings or vents in the sidewall 84 and is open at the end. The insert 80 may also configured with a larger diameter or cross dimension (e.g. 3 inches or more) and be shorter than the insert 60 The insert 80 may be used for retaining larger appliances, such as hair or blow dryers, while the inserts 60 may be used for smaller articles, such as curling irons, etc. In other embodiments, the insert 80 may be smaller than the vented insert 60.

In certain embodiments, O-rings or other mounting devices (not shown) can be used to further secure a receptacle insert in place within the panel 48, if necessary. In one example, this can be done by placing the receptacle insert into the appliance holder opening 50 and then placing an elastomeric O-ring or other member that fits snuggly over the lower end of the receptacle insert, pushing it up to the base of where the receptacle meets the lower surface of the appliance holder panel 48.

Figure 3C:
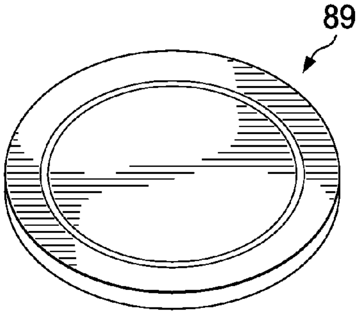
FIG. 3*c* is a perspective view of receptacle cover of the appliance holder system of FIG. 1.

Referring to FIG. 3*c*, an optional receptacle cover 89 may also be provided with the system 10 and placed in the openings or over the receptacle inserts of the panel 48 to close or cover the receptacles and provide a flat and finished surface for receptacles that are not in use.

Figure 4:
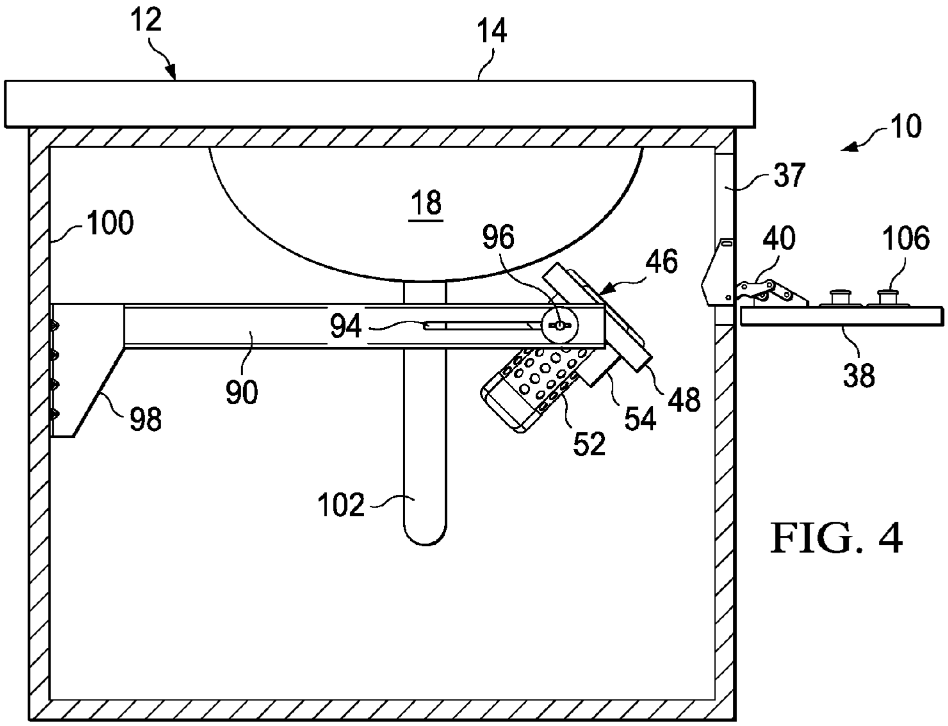
FIG. 4 is cross-sectional side view of the appliance holder system of FIG. 1.
Figure 13:
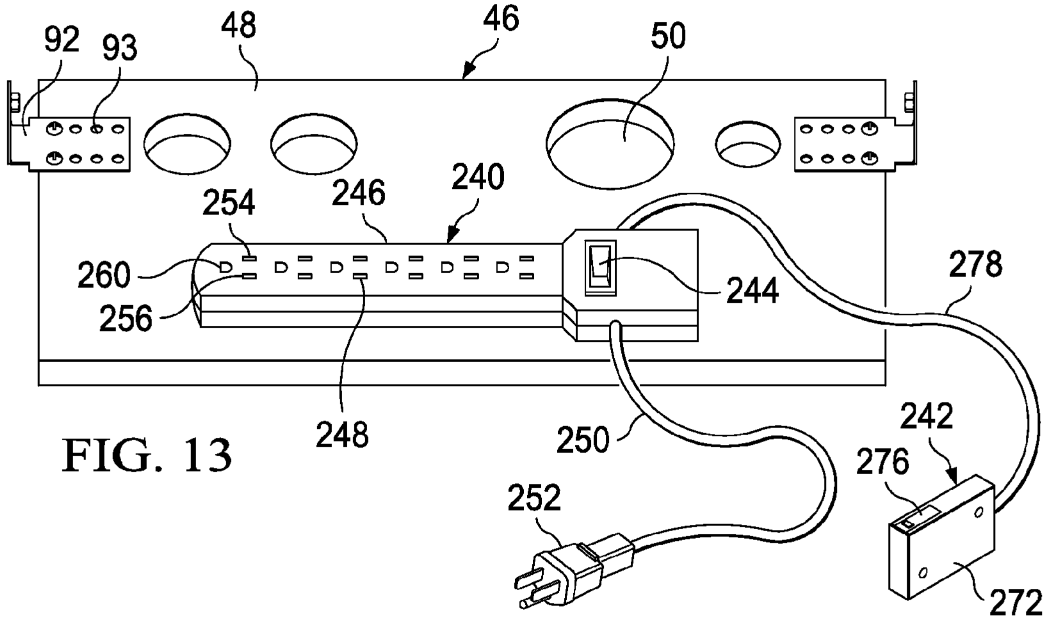
FIG. 13 is a perspective bottom view of the appliance holder assembly of FIG. 5, shown with a power strip having a kill switch assembly that is constructed in accordance with the invention.

Referring again to FIG. 2, the appliance holder assembly 46 further includes a mounting bracket assembly that includes left and right mounting bracket arms 90 that are each coupled at a forward end to opposite sides of the appliance holder panel 48. Panel brackets 92 secured to the lower surface of the panel 48 may facilitate securing of the panel 48 to the bracket arms 90, although other coupling mechanisms may also be used. The panel brackets 92 may couple to the panel at various positions to facilitate the desired spacing of the bracket arms 90. This may be accomplished by providing mounting holes 93 of the brackets 92 at various positions, such as shown in FIG. 13. As shown, the bracket arms 90 may be adjustably coupled to the panel 48. An elongated slot 94 formed in the arms 90 may be used for this purpose. A releasable fastener(s) 96, such as a cooperating threaded bolt(s) and wing nut(s), that is received within the slot 94 may be used to adjustably mount the panel 48 to the bracket arms 90. This allows the panel 48 to be moved to different locations along the length of the mounting bracket arms 90 and at different angled positions relative to the mounting arms 90. As shown in FIG. 4, the surface plane of the panel 48 may be oriented at an angle (e.g. 45 degrees) about a central longitudinal axis from a level or horizontal position. In certain embodiments, the surface plane of the panel 48 may be oriented from 0 degrees to 60 degrees or more from a horizontal orientation, although various orientations may be used. The insert bodies (i.e. 62, 82) will typically be oriented perpendicularly to the surface plane of the panel 48, although other orientations may be used.

The rearward end of the bracket arms 90 may be provided with or coupled to mounting flanges 98 that may abut against a back wall or other structure 100 (FIG. 4) located within the interior of the cabinet assembly 12. If the back wall 100 of the cabinet assembly 12 constitutes dry wall or other materials that may not provide a sufficient or secure structural support to secure the appliance holder assembly 46, additional support structures or members, such as wooden support beams, may be provided and mounted within the interior of the cabinet assembly 12. As can be seen more readily in FIG. 4, the bracket arms extend forward from the back wall 100 a sufficient distance so that the panel 48 is located forward of the sink basin 18, plumbing 102 or other structures located within the interior of the cabinet assembly 12. The arms 90 are also spaced a sufficient distance apart to clear the sink basin 18 and plumbing structures 102. Adjustment of the position of the panel 48 may be made by sliding the fastener 96 within the slots 94 of the mounting arms 90. Additionally, the panel 48 may be oriented at a desired orientation to face the opening 37.

In other embodiments, the bracket arms 90 may be oriented generally vertically so that they engage and are supported by a floor or horizontal support surface within the interior of the cabinet assembly 12. The mounting flanges 98 may be secured or fastened to the floor in such instances.

The panel 48 is positioned within the interior of the cabinet assembly 12 so that it may be readily accessed through the opening 37 when the pivotal panel door 38 is moved to the open position, as shown in FIGS. 1 and 4. The edges of the opening 37 may be beveled, rounded, re-shaped or otherwise modified to remove any sharp edges or corners that a user may come into contact with when placing or retrieving appliances positioned within the appliance holder assembly 46. Additionally, the panel 48 may be recessed within the interior of the cabinet assembly 12 so that any appliances held within the appliance holder assembly 46 do not project through the opening 37 or prevent the pivotal panel door 38 from being fully closed.

Figure 5:
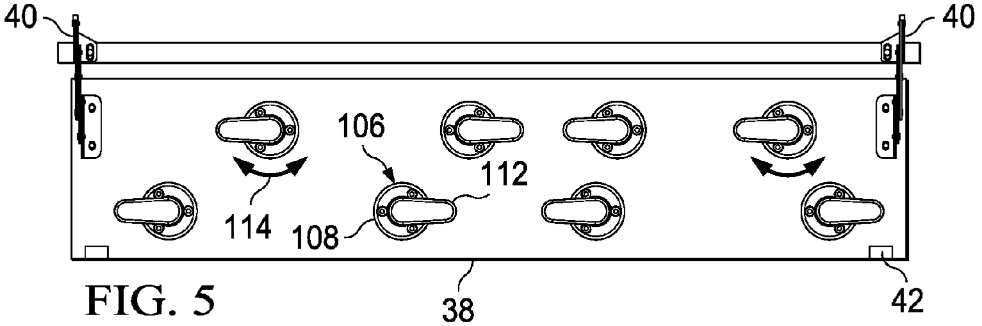
FIG. 5 is a top plan view of a cord storage panel of the appliance holder system of FIG. 1.

Referring to FIG. 5, power cord wrapping elements 106 may be mounted on the inner face of the panel door 38. The wrapping elements 106 shown are in the form of hooks or knobs, each having a base 108 that mounts to the surface of the panel 38 by a suitable fastening mechanism, such as mounting screws, adhesive, etc. A barrel portion 110 extends upward from the base 108 and carries a projecting arm 112 that extends generally laterally away from the barrel portion 110 a distance (e.g. ½ to 3 inches). An example of suitable devices for use as wrapping elements 106 are those devices described in U.S. Pat. No. 5,513,816, which is herein incorporated by reference in its entirety for all purposes.

As can be seen in FIG. 5, the individual wrapping elements 106 are arranged in cooperating pairs. In the embodiment shown, there are four cooperating pairs of wrapping elements 106 provided on the panel 38. The wrapping elements 106 of each cooperating pair are spaced apart a distance to facilitate wrapping or winding of lengths of electrical power cords of appliances stored by the appliance holder system 10 around the wrapping elements 106. The distances between each wrapping element pair may vary depending upon the number of wrapping elements positioned on the panel 38 and the dimensions of the panel. In most cases, the wrapping elements 106 of each cooperating pair are spaced several inches apart (e.g. 4 to 12 inches). As can be seen in FIG. 5, the wrapping element pairs may be arranged in a staggered configuration. Additionally, any two of the wrapping elements 106 positioned on the panel 38 may constitute a cooperating wrapping element pair. The wrapping elements 106 may also be mounted on a common base instead of each wrapping element 106 having its own separate base. The wrapping elements 106 in combination with the panel door 38 on which they are mounted constitute a power cord storage assembly of the appliance holder system 10.

The projecting arm 112 of at least one of the wrapping element pairs 106 is movable or pivotal about the barrel portion 110, as shown by the arrows 114, between a storage position and a release position. When in the storage position, the projecting arms 112 of each pair will generally project away from the other wrapping element 106 of the cooperating pair. When in the release position, at least one of the projecting arms 112 of the wrapping element pairs will generally face the other cooperating wrapping element 106, as designated at A in FIG. 5. In certain embodiments, both the wrapping elements 106 of each pair are pivotal so that in the storage position, the arms 112 of each pair face in opposite directions. In the release position, the arms 112 are pivoted so that the arms 112 generally face one another. This facilitates removal of any power cord that is wrapped about the wrapping elements 106 without having to unwrap the power cord from around the wrapping elements 106 to facilitate its removal. In certain applications a user may wrap a power cord around more than two of the wrapping elements 106. If more than two wrapping elements 106 are used for wrapping a power cord, the wrapping elements 106 are moved to a release position that facilitates removal of the power cord from the wrapping elements 106 without unwrapping the cord. In certain embodiments, the wrapping element of one of the wrapping element pairs may have a non-movable radially extending lip, rim or member that facilitates retaining the power cord in place instead of the arm 112. This may be used in conjunction with a cooperating wrapping element 106 having a projecting arm 112 that is pivotal or movable.

In certain embodiments, the pivotal movement of the arms 112 may be about a horizontal axis wherein the arms are pivoted upward or downward relative to the barrel 110 between the storage and release positions. In certain embodiments, the wrapping elements 106 may utilize non-pivotal movement of the arms 112 between the storage and release positions. For example, the arms 112 may slide linearly along the top of the barrel portion 110 to the opposite side of the barrel 110.

To use the appliance holder system 10, a user will access the interior of the cabinet assembly 12 by opening the panel door 38, as shown in FIG. 1. The user may position various handheld electrical appliances (hair dryer, curling iron, etc.) within any of the receptacles 52, 54, 56 or 58 of the appliance holder panel 48. Other items that do not constitute handheld electrical appliances may be stored in the receptacles as well.

The power cords of the appliances stored in the receptacles 52, 54, 56, 58 may be wrapped around the wrapping elements 106 of a wrapping element pair. For storage, the wrapping elements 106 should be positioned in the storage position with the arms 112 generally facing away from each other. With the power cords of the appliances held within the appliance holder assembly 46, the panel door 38 may be closed. The releasable latch mechanism 42, 44 will retain the panel door 38 in the closed upright position. In this way, the appliances are conveniently stored out of the way and out of view and are readily accessed when needed.

To access the stored appliances, the panel door 38 is opened. The power cord for the desired appliance is removed from the wrapping elements 106. This is done by moving one or more of the cooperating wrapping elements about which the power cord is wrapped to the release position, as described previously. In this way the power cord can be removed without unwrapping the power cord. The power cord may then be plugged into an electrical outlet that may be provided with or near the cabinet assembly 12.

The appliances may be stored within the appliance holder assembly 46 during use when the appliances are plugged in and in a powered state. With respect to heated appliances, this provides a safe and secure means for storing the heated appliance. In the past, users of various electrical handheld appliances would typically rest the appliances on the countertop, where they could easily be knocked or pulled off resulting in damage to the appliance or even injury to those persons located nearby. Storing the appliances in the holder assembly 46 also frees up valuable countertop space. The vented receptacle inserts, such as the insert 60, also prevent overheating of the appliance and allow the appliance to readily cool after its use.

When the appliances are no longer needed, the wrapping elements 106 are returned to the storage position and the power cord(s) of the appliance(s) are wrapped around the wrapping elements 106 for storage. The panel door 38 is returned to the closed position. The panel door 38 when closed will provide a finished appearance to the cabinet assembly 12 and may appear the same or similar to those false panels that are typically used with vanity cabinets.

Figure 6:
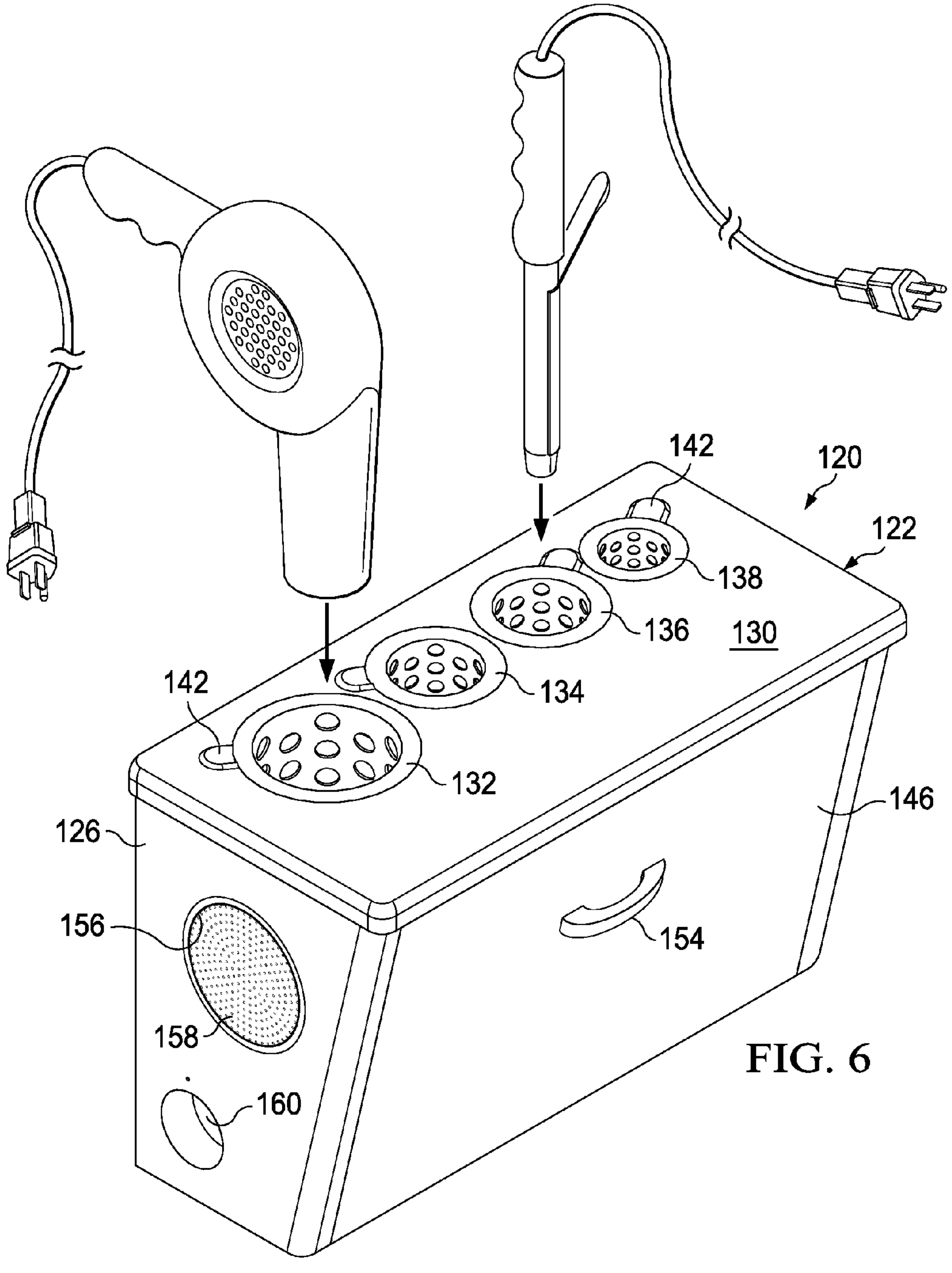
FIG. 6 is a front perspective view of another embodiment of an electrical appliance holder system constructed in accordance with the invention.

Referring to FIG. 6, another embodiment of an appliance holder system 120 is shown. The appliance holder system 120 is a self-contained appliance holder system that may be independent or free-standing and portable. The appliance holder system 120 may also be mounted or fixed to a wall or other support structure. The panel holder system 120 may be configured as a box or cabinet structure 122 that includes an upright rear wall 124 (FIG. 7), opposite upright sidewalls 126, 128, and top 130, which may provide a generally flat horizontal upper surface. The cabinet 122 may also include a floor or base panel (not shown), however, in the embodiment shown no floor is provided, which may facilitate ventilation of the cabinet interior. The cabinet 122 may be sized and configured to rest on a countertop or other surface. The rear wall 124 and sidewalls 126, 128 may constitute legs or support members for supporting the top panel 130 on a support surface. The rear wall 124 may also be provided with holes or mounting structures to facilitate mounting of the system 120 to a wall or other structures. Non-limiting examples of suitable dimensions include cabinets 122 having a width of from about 10 to about 36 inches, a height of from about 6 to about 18 inches, and a depth of from about 3 to about 12 inches. Cabinets of other dimensions may also be employed.

The top 130 constitutes an appliance holder panel and is provided with openings and receptacle inserts 132, 134, 136, 138, which may be constructed similarly to those described previously with respect to the appliance holder system 10, for receiving and storing various appliances or items. The receptacles may be provided in any number and be of the same or different sizes and configurations and may be positioned at various positions in the top panel 130. In the embodiment shown, the receptacles 132, 134, 136, 138 may be generally aligned along the rearward edge of the panel 130. The receptacle inserts may be the same or similar to the inserts 60 and 80, and may be vented or non-vented and may be open, closed or capped at the lower ends, as has been described. As can be seen, a power cord slot or opening 142 may communicate or be provided adjacent to each of the receptacle openings. The slot 142 facilitates the passage of the power cords of electric appliances to the interior of the cabinet body 122. The slot 142 may be sized to allow passage or prevent passage of any plug provided with the power cord. The perimeter or sides of the slot 142 may be rounded or curved, as well as the corners or edges of the slot 142, to facilitate passage of the power cord through the slot 142. Optional plastic grommets or coverings (not shown) can be placed in the cord openings or slots 142 of the top panel 130 to facilitate cord passage and protection of the slot 142. Optional receptacle covers 89 (FIG. 3*c*) may also be provided with the system 120 and placed in the openings or over the receptacle inserts of the top panel 130 to close the receptacles and provide a flat surface on the appliance holder cabinet 122 for the user to place items that may rest on its surface, such as an electric toothbrush, etc.

Figure 7:
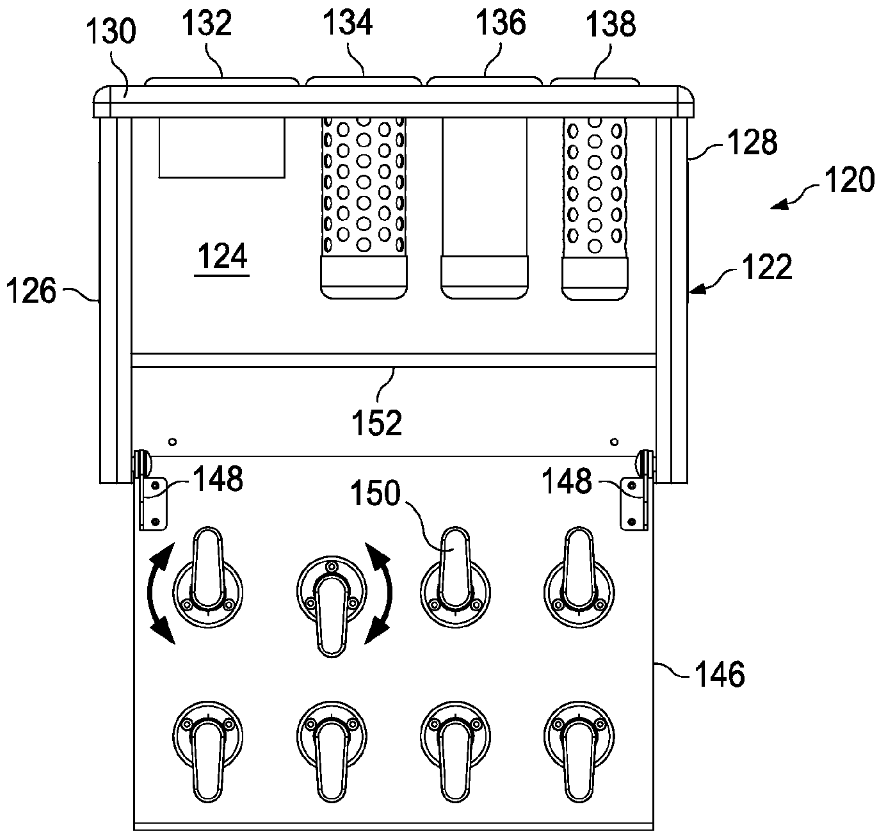
FIG. 7 is a front elevational view of the appliance holder system of FIG. 6, shown with a panel door of the system in an open configuration.

A pivotal panel door 146 is provided at the forward end of the cabinet 122 that may be moved between open and closed positions for closing a forward opening of the cabinet 122 and accessing the interior of the cabinet 122. The panel door 146 may be similar to the panel 38 of the system 10, previously described, and include hinges 148 (FIG. 7) for pivotally mounting the panel 146 to the cabinet 122. As can be seen in FIG. 7, the panel 146 is mounted upon the hinges 148 generally at the corners of the lower forward edge of the cabinet 122 so that the panel pivots generally along a lower, forward horizontal axis of the cabinet 122. The hinges may be positioned at other positions as well. Additionally, in some embodiments, the front of the cabinet 122 may be provided with one or more forwardly located doors that may pivot about either a generally horizontal or vertical axis when being opened and closed. Thus, instead of the panel door 146, the cabinet may be provided with a door or doors like the doors 24, 26 of the system 10 that pivot about a generally vertical axis.

In the embodiment shown, the cabinet 122 is configured with a forward sloping face wherein the depth of the cabinet increases from the lower end to the upper end. This provides a smaller lower foot print of the cabinet 122 so that it consumes less counter space. In other embodiments, the forward face may slope rearwards or may be generally vertical. Other configurations for the cabinet 122 may also be used and the cabinet 122 is not be limited by any particular configuration unless so specified.

In the embodiment of FIG. 7, the hinges 148 may be 180 degree hinges or allow a greater degree of rotation than the 90 degree hinges discussed previously with respect to the hinges 40 of the system 10 so that the panel may hang down in a vertical orientation, as shown in FIG. 7, such as when the system 120 is mounted on a wall. A releasable latching mechanism (not shown), such as the magnetic latching mechanism previously described, may also be provided for securing the door 146 in the closed position. Other non-magnetic latching mechanisms may also be used.

The inner surface of the panel door 146 is provided with power cord wrapping elements 150, which may be provided in cooperating pairs, as previously discussed. The wrapping elements 150 may be the same or similar to the wrapping elements 106 previously described. Corresponding wrapping element pairs 150 may be generally aligned linearly with each of the receptacles 132, 134, 136, 138, as shown in FIG. 7. At least one of the wrapping elements 150 of each pair or both is pivotal between storage and release positions, as shown by the arrows. The panel door 146 and wrapping elements 150 constitute a power cord storage assembly.

A roller 152 may be provided within the interior of the cabinet 122. The roller 152 may extend between and be rotatable or non-rotatably mounted to the sidewalls 126, 128. The roller 152 may be located at an area near the rear of the cabinet 122 interior. If the roller 152 is non-rotatable it may be provided with a smooth or low friction surface that facilitates sliding of the power cords over its surface. As the power cords of the appliances is pulled from either direction the roller 152 facilitates guiding of the power cord past the roller 152.

As shown in FIG. 6, the panel door 146 may be provided with an optional handle 154 on its outer surface to facilitate opening and closing of the panel door 146. The door 146 and cabinet 122 may also be provided with a lock assembly (not shown) for locking the door 146 to prevent unauthorized access to the cabinet interior.

Areas of the cabinet 122 may also be provided with various openings and vents. A vent or opening 156 may be provided on the sidewalls 126, 128 to facilitate venting of the cabinet interior. The vent 156 may be provided with a ventilation cover 158, which may be provided with a plurality of small apertures or openings. The ventilation cover 158 may be formed from stainless steel, plastic or other materials and may provide a finished appearance. An optional opening(s) 160 may also be provided in the cabinet 122, such as in the sidewalls 126, 128. The opening 160 may be used to pass a power cord(s), such as a power cord to an optional power strip that may be used and incorporated with the system 120, as will be described in more detail later on. Optional grommets or covers may be provided with any openings to cover them when they are not in use or to provide a more finished appearance.

In use, the system 120 is positioned on a support surface or mounted to a wall or other structure. Appliances may be stored and held in the receptacles 132, 134, 136, 138. Initially, the user may pass the power cord of any appliance through the slots 142 provided with each receptacle. If necessary, the user may remove the receptacle insert to facilitate passage of the plug of the power cord into the interior of the cabinet 122. With the power cord located within the slot 142, the user may then reinsert the receptacle insert back into the opening in which it is used. The power cord may then be passed behind the roller 152, if one is provided. With the panel door 146 open, the power cord of any appliances may be wrapped around the cooperating wrapping elements 150 that are moved to their storage positions for storage, as has been discussed previously with respect to the system 10. The user may then close the door 146 until the stored appliances of the system 120 are needed.

When a stored appliance is needed, the user opens the panel door 146 to access the stored power cord(s). The user then turns at least one wrapping element to the release position so that the desired appliance power cord may be removed from the cooperating wrapping elements 150 without unwrapping the power cord from the elements 150. The power cord is retained in the slot 142 during use, with the lower end of the power cord being passed out of the forward opening of the cabinet 122 and plugged into an available electrical outlet. The stored appliance may then be removed from its receptacle and the cord pulled to an acceptable length for use. An optional power strip (not shown) may be provide with the system 120, such as within the interior of the cabinet 122, to which the power cords may be plugged into. Alternatively, the entire power cord may be removed from the slot 142 and plugged into an appropriate outlet.

During use, the appliances may be temporarily stored in the receptacles of the system 120 when the appliances are plugged in and in a powered state. Again, this provides a safe and secure means for storing the heated appliances. The vented receptacle inserts also prevent overheating of the appliance and allow the appliance to readily cool after its use.

When the appliance is no longer needed, it may be unplugged and returned to the receptacle, with the power cord being wrapped around cooperating wrapping elements that are positioned in the storage position. The panel door 146 may then be closed to provide a neat and tidy appearance with no visible power cords. If the system 120 is free standing, it may be moved to a storage area until needed.

Figure 8:
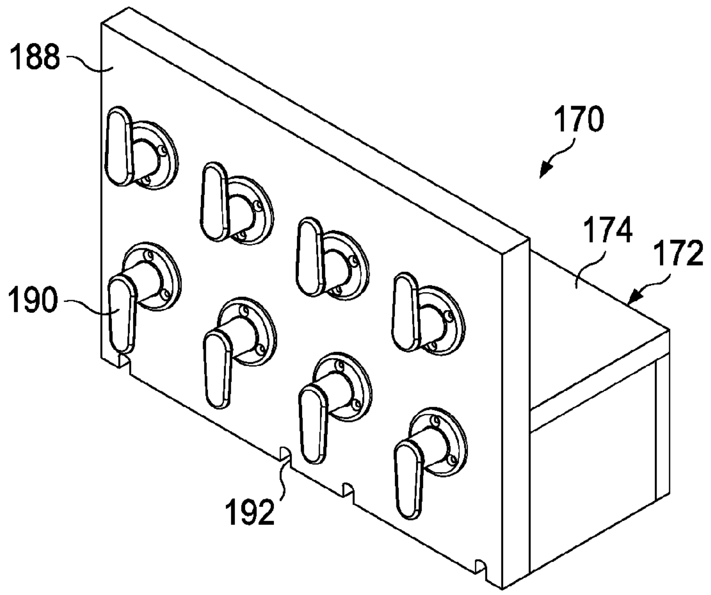
FIG. 8 is a front perspective view of still another embodiment of an electrical appliance holder system constructed in accordance with the invention.
Figure 9:
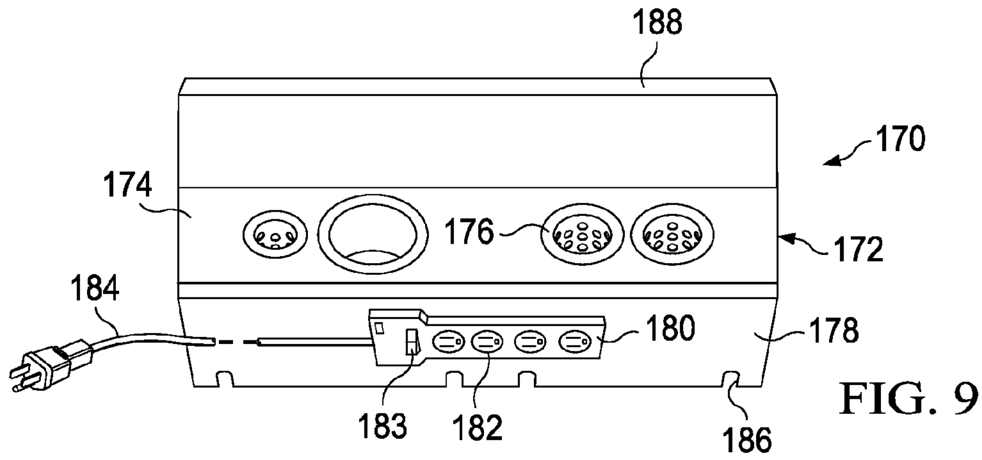
FIG. 9 is a top perspective view of the appliance holder system of FIG. 8.
Figure 10:
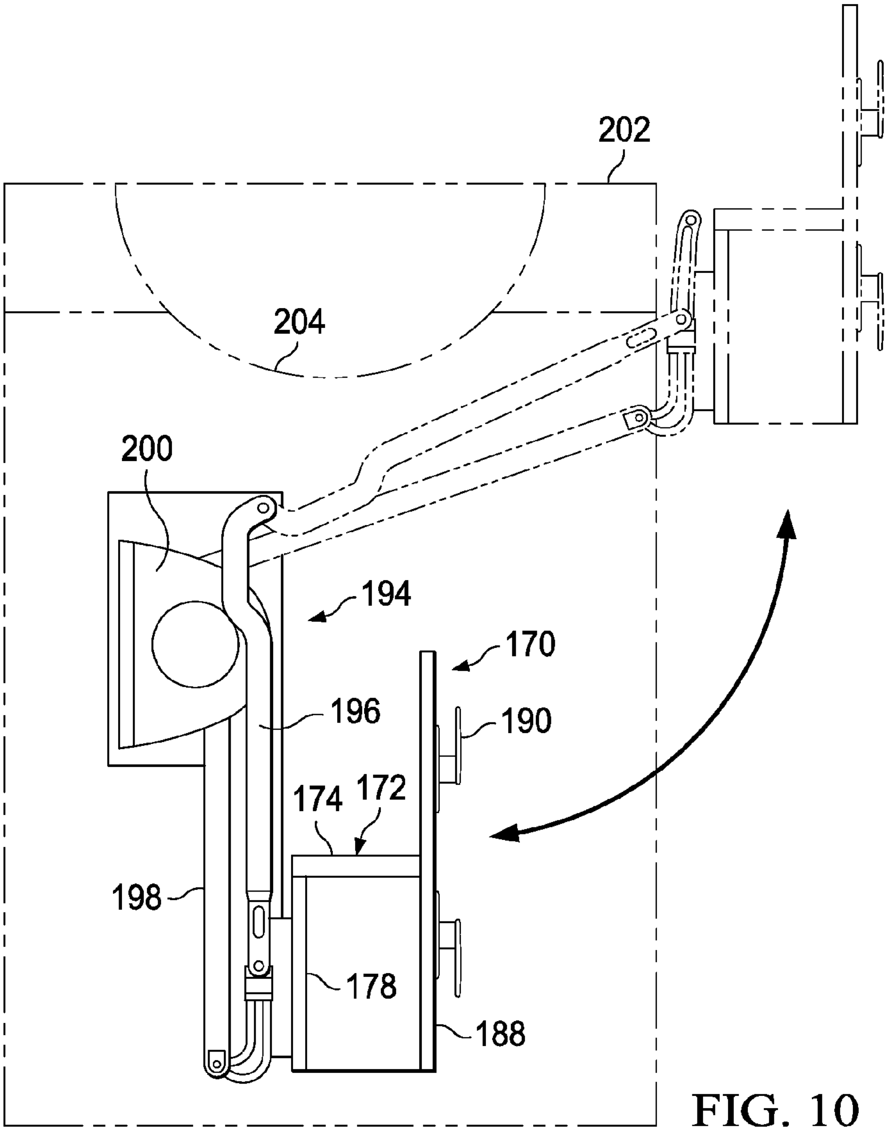
FIG. 10 is a side elevational view of the appliance holder system of FIG. 8 mounted on a pivotable carriage assembly and incorporated with a cabinet assembly, in accordance with the invention.

FIGS. 8-10 show another embodiment of an appliance holder system 170. The system 170 includes an appliance holder assembly 172, which may be in the form of a box-like structure. The appliance holder assembly 172 includes an upper panel 174, which is provided with openings or receptacles that may be provided with receptacle inserts 176, such as the inserts 60, 80 previously described, for receiving appliances and other items.

In the embodiment shown, the assembly 172 includes a rearward wall or panel 178. As can be seen in FIG. 9, a power strip 180 may be provided with the assembly 172 and may be mounted to the rearward wall 178 or other areas of the assembly 172. The power strip 180 includes sockets 182 for electrical and mechanical engagement with plugs of appliance power cords. The power strip 180 may have a sufficient number of sockets 182 to power appliances stored in each of the receptacles 176. The number of sockets 182 may correspond to the number of receptacles 176 provided. The power strip 180 may include an on/off switch 183 and may be provided with ground fault circuit interrupter (GFCI) unit. A power cord 184 of the power strip 180 is provided for coupling to an outlet located in the area in which the system 170 is used. Power cord slots or openings may be provided in the lower edge of the rear panel 178 to accommodate power cords of appliances stored in the system 170 that are passed below the assembly 172, as will be described later on.

The assembly 172 may also include a pair of opposite upright sidewalls that join the panels 174, 178.

Referring to FIG. 8, the forward face of the system 170 is formed by an upright power cord storage panel 188. As shown, the panel 188 extends from the lower edge of the assembly 172 and may extend for a distance above the upper panel 174. In other embodiments it may be level with the upper panel 174. The panel 188 provides a surface to which wrapping elements 190 are mounted. The wrapping elements 190, which may be similar to those wrapping elements previously described, are arranged in cooperating pairs with at least one or both of the wrapping elements being movable between storage and release positions. The panel 188 and the wrapping elements 190 constitute a power cord storage assembly.

Slots or openings 192 may also be provided along the lower edge of the panel 188 to facilitate the passage of power cords of appliances stored in the system 170. A tube or casing (not shown) may be mounted to and extend between each of the slots 186 and 192. The tube or casing may be formed of metal, heat-resistant plastic or other material to protect the power cords from heat from the appliances.

The system 170 may be used as an independent or standalone system.

Referring to FIG. 10, the system 170 may also be used with a carriage assembly 194. The carriage assembly 194 is in the form of a hydraulic lift that includes opposite sets of hydraulically actuated lift arms 196, 198 that are each pivotally mounted at one end to mounting base 200. Other non-hydraulic lift mechanism may also be employed. The system 170 with the carriage assembly 194 may include a cabinet assembly 202, such as a vanity cabinet that may include a sink 204. The mounting base 200 for each of the sets of hydraulic lift arms 196, 198 may be mounted within the interior of the cabinet assembly 202 to opposite sidewalls of cabinet assembly 202. The opposite ends of the lift arms 196, 198 are pivotally mounted to the appliance holder assembly 172, such as at the rear panel 178 or the sidewalls. The carriage assembly 194 and the appliance holder system 170 may be mounted to clear the sink 204 and other plumbing structures that may be located within the interior of the cabinet 202. The power cord 184 of the power strip 180 may have a sufficient length to allow movement of the system 170 between the extended and retracted positions.

The carriage assembly 194 provides pivotal movement of the appliance holder system 170 between a retracted position, indicated by the solid lines in FIG. 10, and an extended position, indicated by the dashed lines of FIG. 10. When the carriage assembly 194 is in the retracted position, the appliance holder system 170 locates fully within the interior of the cabinet 202 at a lowered position. When the carriage assembly is moved to the extended position, the appliance holder system 170 is moved upwards and outwards to a position wherein all or at least a portion of the appliance holder system is located exterior to the cabinet assembly 202. The carriage assembly 194 may lock or latch in the retracted position and be actuated to move to the extended position by exerting sufficient force to overcome the locking forces. Once in the extended position, the carriage assembly 194 is pushed back to the retracted position. Electrical powered actuation systems may also be employed. An example of a suitable commercially available hydraulic carriage assembly that may be used for the carriage assembly 194 includes those marketed as SERVO™, STRATO™ and SENSO™ lift systems, available from Hafele America Co., located in Archdale, N.C. The instruction manuals for these lift systems identified by Item Nos. 372.64 Series, 372.67 Series and 372.68 Series are each incorporated by reference herein for all purposes.

In use, the appliance holder system 170 is used in a similar manner to those systems previously described. Initially, the appliance holder system 170 mounted to the carriage assembly 194 may be in the extended position and at a position exterior to the cabinet 202, as shown by the dashed lines of FIG. 10. Appliances may be positioned within the receptacles 176. The power cords of each of the appliances may be passed below the assembly 172, with the cords passing through the slots 186, 192 provided, and wrapped around the cooperating wrapping elements 190, which are positioned in the storage position. The carriage assembly 194 may then be moved to the retracted position so that the system 170 locates within the interior of the cabinet 202, as shown in FIG. 10. Any doors (not shown) for the forward opening of the cabinet assembly 202 may be closed so that the appliance holder system is out of the way and out of view.

When desired, any door or doors of the cabinet 202 may be opened and the system 170 may accessed and moved to the extended position for use. This may be accomplished by actuating or releasing the hydraulic carriage assembly 194, such as by slightly pulling on the system 170 to overcome any locking or latching mechanism or forces, so that the system 170 is moved to the extended position. The power cords of desired appliances may be released from the power cord storage assembly by moving at least one or both of the cooperating wrapping elements 190. The plug of the power cord of any appliance may be conveniently plugged into one of the sockets 182 of the power strip 180.

During use, the appliances may be stored in the receptacles of the system 170 when the appliances are plugged in and in a powered state. Again, this provides a safe and secure means for storing the heated appliance. The vented receptacle inserts also further prevent overheating of the appliance and allow the appliance to readily cool after its use.

When the appliance is no longer needed, it may be unplugged and returned to the receptacle for storage, with the power cord being wrapped around cooperating wrapping elements that are positioned in the storage position. Alternatively, the appliance may remain plugged into the power strip 180. The system 170 may then be moved to the retracted position, as described previously.

Figure 11:
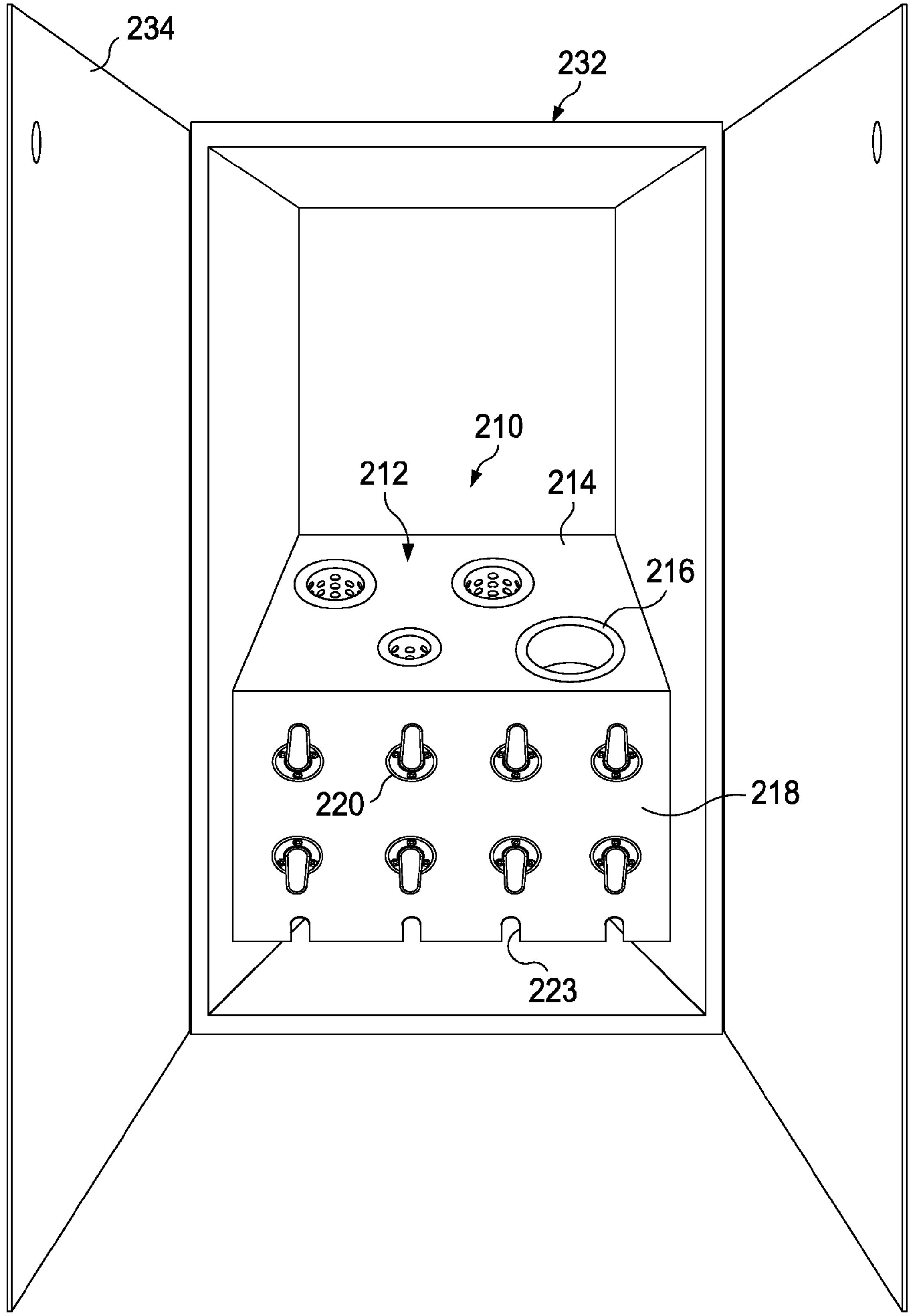
FIG. 11 is a front perspective view of another embodiment of an appliance holder system mounted on a linearly movable carriage assembly and shown in a retracted position within a cabinet assembly, in accordance with the invention.
Figure 12:
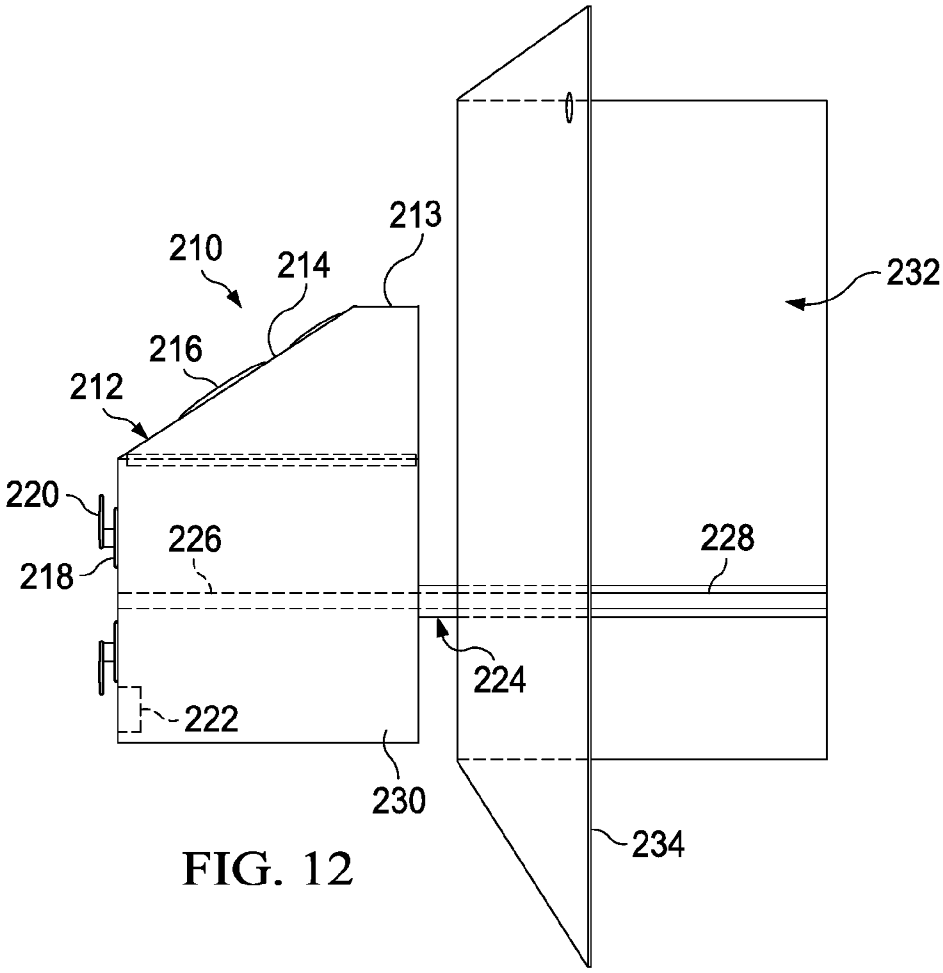
FIG. 12 is a side elevational view of the appliance holder system of FIG. 11, shown in an extended position.

Referring to FIGS. 11 and 12, another embodiment of an appliance holder system 210 is shown. The system 210 includes an appliance holder assembly 212, which may be in the form of a box-like structure or cabinet. The appliance holder assembly 212 includes an upper panel 214, which is provided with openings or receptacles that may be provided with receptacle inserts 216, such as the inserts 60, 80 previously described, for receiving appliances and other items. As can be seen, all or a portion of the upper panel 214 is sloped downward from the rearward end to facilitate accessing of appliances stored in the receptacles 216. The upper panel 214 may also be generally horizontal. As shown in FIG. 12, a rearward horizontal portion 213 of the upper panel 214 may constitute a shelf or area for placing and resting items.

A forward wall or panel 218 of the system 210 constitutes an upright power cord storage panel. As shown, the panel 218 extends from the lower edge of the assembly 212 to the lower edge of the upper panel 214. The panel 218 provides a surface to which wrapping elements 220 are provided. The wrapping elements 220 are similar to those previously described and are arranged in cooperating pairs with at least one or both of the wrapping elements being movable between storage and release positions, which may be similar to those wrapping elements previously described. The panel 218 and the wrapping elements 220 constitute a power cord storage assembly. In a variation, the upper panel 214 and power cord storage panel 218 may be a single downward sloping panel that extends to the lower forward edge of the assembly 212. The power cord storage panel 218 would be provided by a receptacle-free area of the panel to which the wrapping elements 220 may be mounted.

A power strip 222, which may be similar to the power cord strip 180 previously described, may be provided with the assembly 212. In the embodiment shown, the power strip 222 is located at the lower forward end of the assembly 212 and is mounted to the panel 218 on the rearward side. The power strip 222 may be mounted to other areas, as well. Slots 223, similar to the slots 186, 192, may be formed on the lower edge of the panel 218 to facilitate passage of the power cords to the power strip 222.

The system 210 may be stationary, free-standing or used with a carriage assembly 224. The carriage assembly 224 includes rails, slides or tracks 226, 228 for mounting to sidewalls 230 or other areas of the appliance holder assembly 212 and to a cabinet assembly 232. The cabinet assembly 232 may be similar to those cabinet assemblies previously described and may be free-standing or be that incorporated into a room of a building or dwelling. The cabinet assembly 232 may also include doors 234 for selectively closing and opening a forward opening of the cabinet 232.

The carriage assembly 224 and the rails, slides or tracks 226, 228 and other components may be the same or similar to those carriage assemblies commonly used for the drawing and closing drawers in cabinets, desks and similar structures. Those rollers, wheels, etc. and other components that are typically used for such carriage assemblies would also be employed with the carriage assembly 224.

The carriage assembly 224 allows the system 210 to be moved linearly between extended and retracted positions relative to the cabinet 232. In the retracted position, the system 210 may be located within the interior of the cabinet 232 so that the doors 234 may be closed and the system may be out of the way and hidden from view. In the extended position, all or of a portion of the system 210 is located exterior to the cabinet 232.

In certain embodiments of the appliance holder system employing a movable carriage assembly, the cord wrapping elements may be fixed so that they are not movable between storage and release positions.

In use, appliances may be positioned in the receptacles 216 and the power cords of the appliances may be wrapped around the wrapping elements 220 that are in their storage positions, as described with respect to the other embodiments. The system 210 is then moved to the retracted position through the forward opening of the cabinet 232 for storage.

When desired, the user may access the retracted system 210 and move it to the extended position through the forward opening of the cabinet 232. The power cord of the desired appliance may be released by moving at least one or all of any cooperating wrapping elements 220 on which it is wrapped so that the power cord may be removed from the wrapping elements without unwrapping it. The plug of the appliance power cord may be plugged into the power strip 222. In certain instances, the power cord may be remained plugged into the power cord during storage. The back and lower end of the assembly 212 may be open to allow access to the interior of the assembly 212 and the power strip 222. One or both of the sidewalls 230 may also be eliminated to access the area below and behind the panels 214, 218 and the power strip 222.

During use, the appliances may be temporarily stored in the receptacles of the system 210 when the appliances are plugged in and in a powered state. Again, this provides a safe and secure means for storing the heated appliance. The vented receptacle inserts also prevent overheating of the appliance and allow the appliance to readily cool after its use.

When the appliance is no longer needed, it may be unplugged and returned to the receptacle 216, with the power cord being wrapped around cooperating wrapping elements 220 that are positioned in the storage position. Alternatively, the appliance may remain plugged into the power strip 222. The system 210 may then be moved to the retracted position, as described previously.

Figure 14:
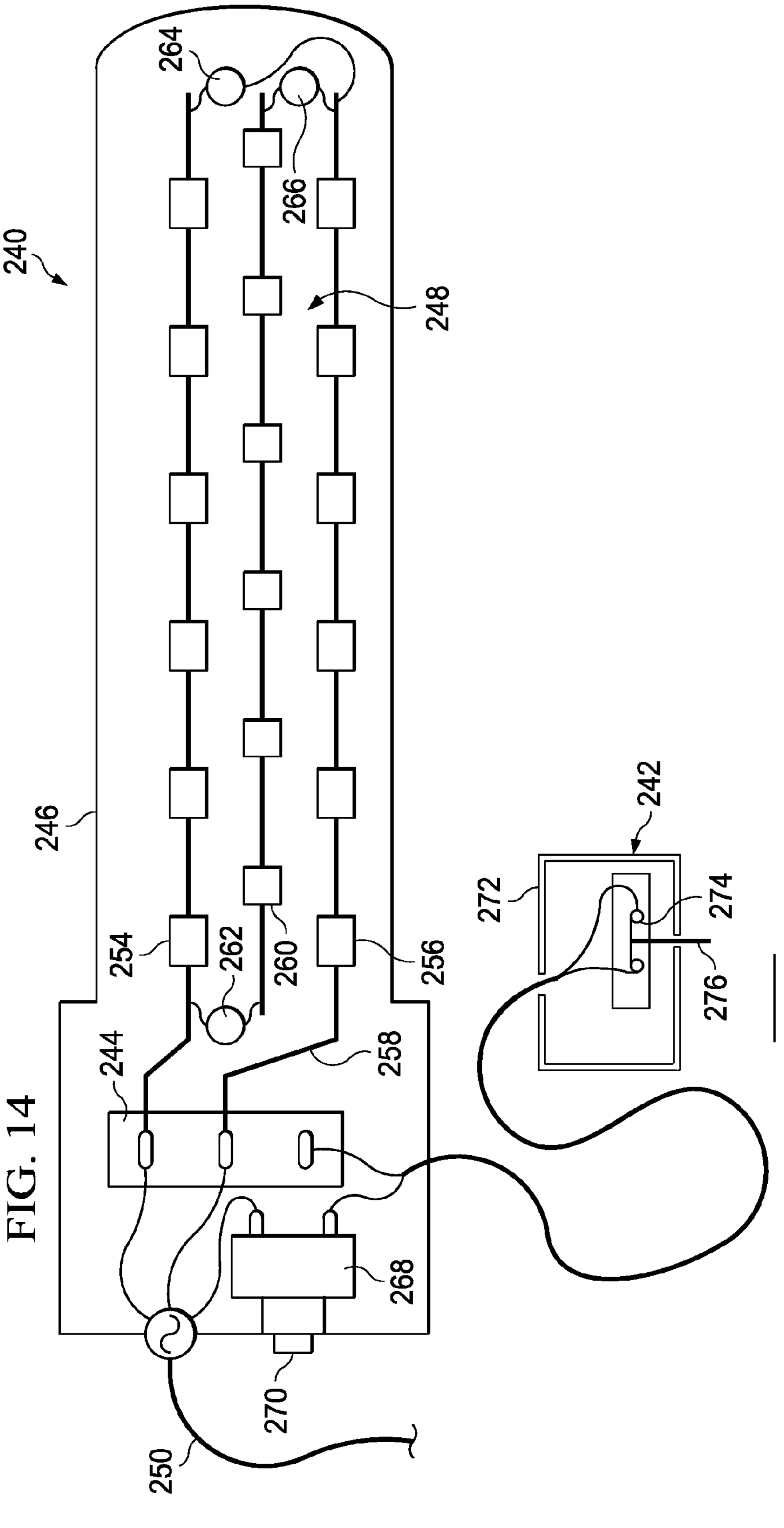
FIG. 14 is a schematic of the power strip of FIG. 13.

Referring to FIGS. 13 and 14, a power strip 240 is shown for use with any of the appliance holder systems that has been described herein, as well as for other purposes. The power strip 240 may be similar to those previously described, however, the power strip 240 includes an additional kill switch assembly 242 that overrides and deactivates the power strip 240 separately from the on/off switch 244 that are provided on most power strips when the kill switch 242 is actuated.

The power strip 240 includes a housing 246 for housing the various components of the power strip 240. A plurality of sockets 248 are provided for electrical and mechanical engagement with a plug of a power cord. The power strip 240 also includes its own power cord 250 and plug 252 for plugging into an electrical outlet, such as those 120 V electrical outlets that are commonly used in the United States. Other configurations for the power strip 240 and plug 252 may also be used, such as those that are common in areas outside the United States.

Referring to FIG. 14, a schematic of the power strip 240 is shown. Each socket 248 of the power strip 240 may include a neutral slot 254 and a "hot" slot 256, with normal current flow from the cord 250 plugged into an electrical outlet flowing through the power strip circuitry designated generally at 258 between these two slots 254, 256. The socket 248 also includes a ground slot or hole 260, such as is well known. The power strip 240 may be configured as a surge protector and include varistors 262, 264, 266, such as MOV varistors, to protect the power strip 240 and appliances plugged into it from excessive voltage or current surges. A GFCI unit 268 may also provided with the power strip 240 and wired into the power strip circuitry 258, which may include a reset button 270 commonly used with such GFCI units.

The kill switch assembly 242 may include a housing 272 for housing components of the kill switch assembly 242. The kill switch assembly 242 includes an electrical switch 274 having an actuatable engagement arm, member or other mechanism 276 that actuates the switch 274. The switch 274 is electrically coupled to a length of flexible electrical wiring 278 to the power strip circuitry 258 so that the switch assembly 242 may be positioned at a desired position, which may be at a distance from the power strip housing 246. In the embodiment shown, the wiring 278 is wired to the GFCI unit 268 and on/off switch 244. The wiring 278 may wired to other areas of circuitry 258 of the power strip 240 to facilitate deactivating the power strip.

In use, the power strip 240 may be mounted to a portion of any of the appliance holder systems previously described. As shown in FIG. 13, the power strip 240 is mounted to the lower surface of the appliance panel 48 of the appliance holder system 10, described previously. The kill switch assembly 242 may be mounted to an area of the appliance holder system or that the appliance holder system is incorporated with. The kill switch assembly 242 may be mounted and/or positioned in an area so that the actuating mechanism 276 engages a movable portion of any of the appliance holder systems described herein. The movable portion of the appliance holder may include a cooperating structure, such as an arm, lever, projection, surface, etc., that facilitates engagement with the actuating mechanism 276.

The movable portion may be that which is moved to a closed or retracted position when the appliance holder system is being stored. Thus, as a non-limiting example with respect to the appliance holder system 10 of FIGS. 1-4, the kill switch assembly 242 may be mounted to the cabinet assembly 12 so that when the panel door 38 is closed, a portion of the panel door 38 will engage the kill switch actuating mechanism 276 to activate the kill switch 242 and deactivate or cut power to the power strip 240. The kill switch assembly 242 may alternatively be mounted a movable component of the appliance holder systems as well, such that the actuating mechanism 276 is engaged by a stationary portion of the system 10. Thus, the kill switch 242 may be mounted to the panel door 38 with the actuating mechanism 276 engaging a portion of the cabinet assembly 12 when the door 38 is closed. For the system 120 of FIGS. 6-7, the kill switch assembly 242 may be mounted to the door 146 or to the cabinet 122 and may be actuated upon closing of the panel door 146. For the system 170 of FIGS. 8-10, the kill switch assembly 242 may be positioned on any portion of the appliance holder system 170 or carriage assembly 194 or the cabinet 202 and may be actuated upon engagement and movement of the appliance holder system to the retracted position or when any doors of the cabinet assembly 202 are closed. For the appliance holder system 210 of FIGS. 11-12, the kill switch assembly 242 may be provided on the assembly 212 or cabinet 232 and be actuated to depower the power strip 240 when the assembly 212 is moved to the retracted position within the cabinet 232 or when the cabinet doors 234 are closed.

Any of the appliance holder systems described or claimed herein may also be provided as a kit for construction, assembly, installation and use of the systems. This may include any and all of the components described herein for any of the systems. The components of the kit may be provided in a completely unassembled configuration or as a partially assembled configuration. A set of printed, audio and/or video instructions may be provided with the kit detailing the method of construction, assembly, installation and use may be included with the kit, as well as any product packaging for containing the kit as a unit or units. Templates, such as templates to facilitate cutting, drilling, sizing, etc. of the components of the appliance holder system, may also be provided with the kit. The kit may also include installation tools that may be necessary for assembling the system. The kit may facilitate the construction of a free standing or self-contained appliance holder system or one that is incorporated into previously existing cabinetry or other structures.

Figure 15:
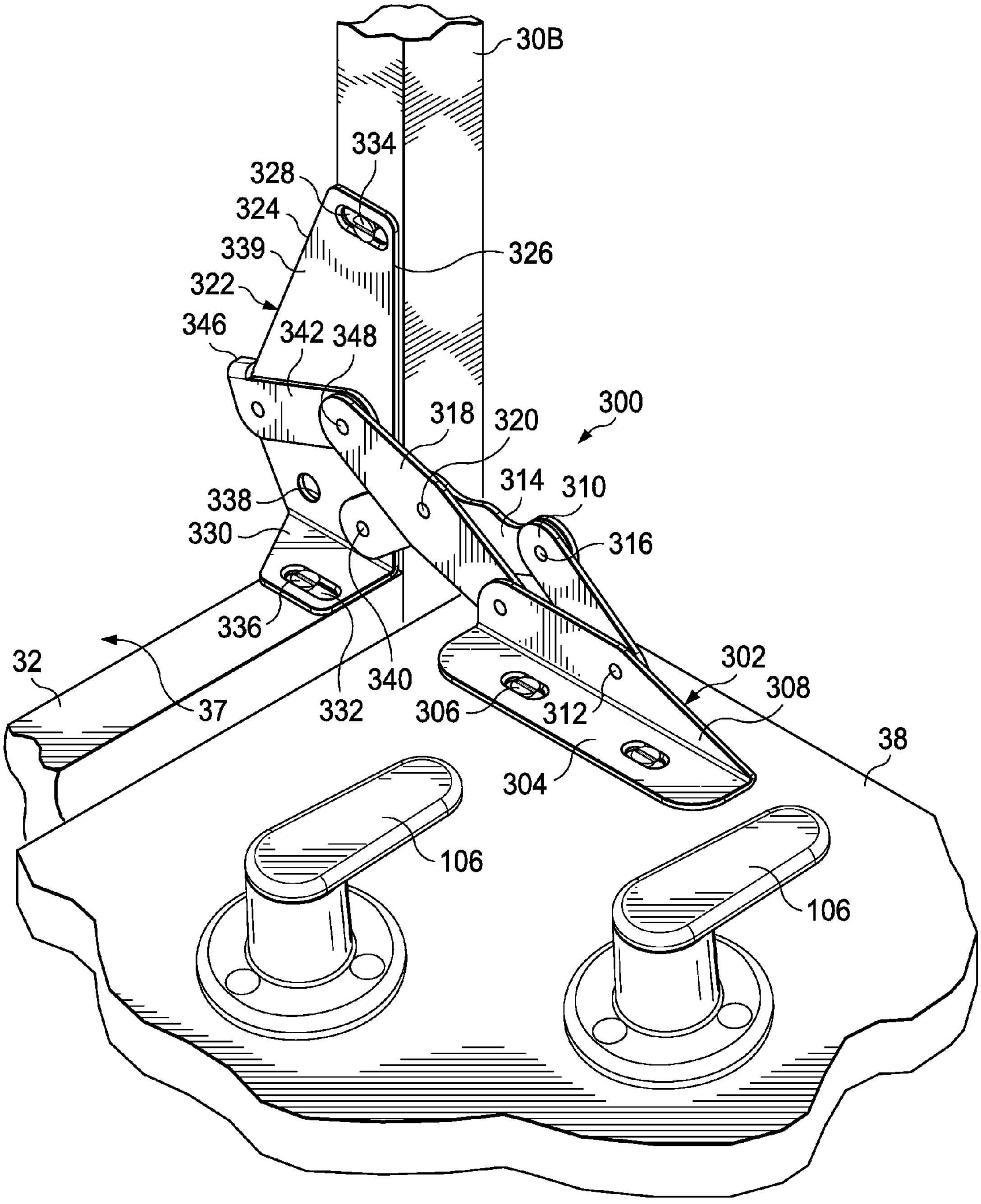
FIG. 15 is a perspective view of a hinge for use in an appliance holder system and that is constructed in accordance with the invention.

Referring to FIG. 15, a hinge 300 is shown that may be used with the various appliance holder systems, such as the system 10, and may be used for the hinges 40 described for the system 10 as well as hinges for other systems. The hinge 300 may be a 90 degree hinge, although it may be movable through other angles as well. The hinge 300 may be used in appliance holders and cabinet assemblies where the walls, panels and framing members of the structures have a limited thickness. In particular, the hinge 300 may be used with structural members having a thickness of from 1 or ¾ inch to about ½ inch or less. The hinge 300 provides at least two spaced apart mounting points that interface and couple to a side surface of the structural members having a thickness of from 1 inch or ¾ inch to about ½ inch or less.

The hinge 300 and its components may be constructed of metal and is shown as a right handed hinge in FIG. 15 and mounted to the frame member 30*b* and panel 38 of the appliance holder system 10, previously described. A hinge configured as a minor image of the hinge 300 may be used for the opposite side of the panel 38 as a left hand hinge. The hinge 300 includes a panel mounting flange 302 having a planar base 304 that abuts against the rearward surface of the panel 38 adjacent to the lower and right side edges. A pair of spaced apart screws 306 (e.g. wood screws) or other fasteners may be used for mounting the hinge 300 to the panel 38. Holes in the mounting flange base 304 may be counter sunk for use with wood screws to provide a flush appearance. The mounting flange 302 includes a planar arm flange 308 that extends away from the base 304 in a plane generally parallel to the direction of rotation of the hinge 300. A planar mounting arm 310 is pivotally mounted at its forward end by pivotal coupling 312 (e.g tubular rivet, pin, etc.) or other fastener suitable for pivotal movement to a forward end of the arm flange 308. The opposite end of the mounting arm 310 is pivotally coupled to the forward end of a planar lower bracket arm 314 through a pivotal coupling 316.

A planar connecting arm 318 is pivotally coupled at its forward end to the rearward end of the arm flange 308. As can be seen, the bracket arm 314 is pivotally coupled at an intermediate position to an intermediate portion of the connecting arm 318 at pivotal coupling 320. The rearward end of the bracket arm 314 extends to a support bracket 322.

The support bracket 322 includes a planar upright support bracket flange 324 that is configured for abutting directly against a flat structural support member, such as the portion of the frame member 30*b* that lies within the open area 37. The bracket flange 324 is configured for use with structural members having narrow thicknesses of from about 1 or about ¾ inch to about ½ inch or less. The bracket flange 324 has an upright forward edge 326 that is configured to lie behind or flush with the forward end of the upright or vertical frame member 30*b* or other upright structural member or wall to which it is mounted. An elongated mounting slot 328 extends through the thickness of the bracket flange 324 and extends rearward from just behind the forward edge 326. The slot 328 may have a length of about ¾ inch or less or that generally corresponds to the thickness of the structural member for which it is to be used and should overlay the inner edge of the member 30*b* and in some embodiments may extend rearward no further than 1 inch from the forward edge 326.

The support bracket 322 also includes a planar floor flange 330 that is perpendicular to and extends inward from the bracket flange 324. The forward edge of the floor flange 330 may lie in a plane parallel to the forward edge of the bracket flange 324. The floor flange 330 also includes an elongated slot 332 that is positioned and configured similarly to the slot 328 so that it overlays the horizontal frame member 32. The position and length of the slots 328, 332 allow the support bracket 322 to be mounted to thin structural members (<¾ or <1 inch) that are commonly used in modern cabinet assemblies. The slots 328, 332 may also be counter sunk or provided with a beveled edge for cooperating engagement with the tapered head of a wood screw, such as the screws 334, 336. An additional hole or opening 338 may be provided at a lower end of the bracket flange 324 on a rearward projecting portion 339 of the bracket flange 324. The hole 338 may be a countersunk hole and may be located 1 inch or more from the forward edge 326 and may be used for optionally fastening to structural members that are greater than 1 inch in thickness.

The rearward end of the lower bracket arm 314 is pivotally coupled through pivotal coupling 340 to the bracket flange 324 just above the floor flange 330. The connecting arm 318 is connected at its rearward end to the forward end of a planar upper bracket arm 342. The rearward end of bracket arm 324 is pivotally coupled to the extended portion 339 of the bracket flange 324 through pivotal coupling 344. The rearward end of the bracket arm 342 is also provided with a stop member 346 that engages the bracket flange 324 to limit movement of the hinge 300, such as when the hinge is opened approximately 90 degrees. The forward end of the upper bracket arm 342 is pivotally coupled to the rearward end of the connecting arm 318 through pivotal coupling 348. The various planar hinge arms all lie in planes perpendicular to the axes of hinge rotation of the pivotal couplings. Because the various hinge arms of the hinge 300 interrelate and are coupled in the manner described, limiting pivotal movement of the upper bracket arm 342 also limits movement of all the other hinge arms as well and thus prevents further movement or rotation of the hinge 300, such as at a 90 degree position as shown. The position of the stop member 346 could be moved or the stop member eliminated to allow for different degrees of hinge rotation for the hinge 300 as well.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

The invention claimed is:

1. An appliance holder system for electrical handheld appliances of the type having a flexible electrical power cord attached thereto, the appliance holder system comprising:

an appliance holder assembly having at least one receptacle for receiving and storing at least one electrical handheld appliance having a flexible electrical power cord attached thereto; and a power cord storage assembly being movable relative to the appliance holder assembly between an open position and a closed position, the power cord storage assembly having a pair of spaced apart cord wrapping elements about which the flexible electrical power cord may be wrapped for storage, at least one of the cord wrapping elements being movable between a storage and release position, the cord wrapping elements being configured to retain the wrapped power cord upon the power cord storage assembly when the at least one of the cord wrapping elements is in the storage position and wherein the wrapped power cord may be removed from the power cord storage assembly without unwrapping the wrapped power cord when the at least one of the cord wrapping elements is moved to the release position; and wherein the appliance holder system is configured as a self-contained cabinet that is independent from any other cabinetry, the appliance holder assembly being incorporated into the self-contained cabinet and wherein the power cord storage assembly is mounted on a movable portion of the self-contained cabinet that is movable between open and closed positions, the self-contained cabinet including an opening formed in a sidewall of the self-contained cabinet, the opening being provided with a metal vent assembly for venting of the enclosure.

2. The appliance holder system of claim 1, wherein: the power cord storage assembly locates within the interior of the cabinet when in the closed position.

3. The appliance holder system of claim 1, wherein: the movable portion of the cabinet is comprised of a pivotally mounted panel of the cabinet.

4. The appliance holder system of claim 3, wherein: the pivotally mounted panel allows access to the appliance holder assembly within the interior of the cabinet assembly when the panel is moved to the open position.

5. The appliance holder system of claim 3, wherein: the power cord storage assembly is mounted on an inner surface of the panel.

6. The appliance holder system of claim 1, wherein: the power cord storage assembly has three or more spaced apart cord wrapping elements about which the flexible electrical power cord may be wrapped for storage, at least two of the three or more spaced apart cord wrapping elements forming cooperating cord wrapping elements, at least one of the cord wrapping elements of the cooperating cord wrapping elements being movable between a storage and release position, the cooperating cord wrapping elements being configured to retain the wrapped power cord upon the power cord storage assembly when the at least one of the cord wrapping elements of the cooperating cord wrapping elements is in the storage position.

7. The appliance holder system of claim 1, further comprising:

a power strip having at least one electrical socket for receiving a plug of an electrical power cord.

8. The appliance holder system of claim 7, wherein: the power strip has an on/off switch and is further provided with a kill switch for deactivating the power strip separately from the on/off switch when the kill switch is actuated.

9. The appliance holder system of claim 8, wherein: the kill switch is actuated by engagement with a moving portion of the appliance holder system.

10. The appliance holder system of claim 1, wherein: the receptacle includes a receptacle insert having an insert body having an opening at one end and a sidewall that defines a hollow interior of the body, the sidewall having at least one hole formed therein to facilitate ventilating the interior of the insert body.

11. The appliance holder system of claim 10, wherein: the receptacle insert includes a releasable end cap that selectively couples to the insert body for closing or opening an opening at an opposite end of the insert body to prevent the passage of the at least one electrical handheld appliance through the interior of the insert body.

12. The appliance holder system of claim 1, further comprising:

an electrical power strip, the electrical power strip comprising:

a power strip housing;

at least one electrical socket, the socket having a neutral slot, a hot slot and a ground slot for receiving a plug of electrical power cord;

at least one of a surge protector and a GFCI unit;

a power cord for electrically coupling the power strip to an electrical power source;

and on/off switch for selectively activating and deactivating the power strip; and a kill switch for deactivating the power strip separately from the on/off switch when the kill switch is actuated.

13. The appliance holder system of claim 12, wherein: the kill switch is actuated by engagement with a moving portion of the appliance holder system.

14. The appliance holder system of claim 1, wherein: the receptacle includes an insert body having an upper opening at one end and a sidewall that defines a hollow interior of the insert body, and a releasable end cap that selectively couples to the insert body for selectively closing or opening an opening at a lower end of the insert body to prevent or allow the passage of items through the lower end of the insert body.

15. The appliance holder system of claim 1, further comprising:

a carriage assembly for movably mounting the appliance holder system to a structure, and wherein the appliance holder system is fully supported by and movable upon the carriage assembly between extended and retracted positions relative to the structure.

16. The appliance holder system of claim 15, wherein: the carriage assembly provides linear movement between the extended and retracted positions.

17. The appliance holder system of claim 15, wherein: the carriage assembly provides pivotable movement between the extended and retracted positions.

18. The appliance holder system of claim 1, wherein: the cabinet has a width of from about 10 to about 36 inches, a height of from about 6 to about 18 inches, and a depth of from about 3 to about 12 inches.

19. The appliance holder system of claim 1, wherein: the depth of the cabinet increases from a lower end to an upper end.

20. The appliance holder system of claim 1, further comprising:

a releasable latching mechanism for securing the movable portion in the closed position.

21. The appliance holder system of claim 1, wherein: the movable portion of the self-contained cabinet is pivotally movable between open and closed positions on hinges that allow a degree of rotation from 60 to 180 degrees.

* * * * *